US012412459B1

(12) United States Patent
Strzelec et al.

(10) Patent No.: US 12,412,459 B1
(45) Date of Patent: Sep. 9, 2025

(54) METHOD AND SYSTEM FOR UNAUTHORIZED PERSON ALERTING

(71) Applicant: MOTOROLA SOLUTIONS, INC., Chicago, IL (US)

(72) Inventors: Oliwia Strzelec, Warsaw (PL); Wojciech Korzybski, Cracow (PL); Piotr Dziedzic, Cracow (PL); Grzegorz Zych, Cracow (PL)

(73) Assignee: MOTOROLA SOLUTIONS, INC., Chicago, IL (US)

(*) Notice: Subject to any disclaimer, the term of this patent is extended or adjusted under 35 U.S.C. 154(b) by 0 days.

(21) Appl. No.: 18/796,809

(22) Filed: Aug. 7, 2024

(51) Int. Cl.
*H04N 21/43* (2011.01)
*G07C 9/20* (2020.01)
*G08B 13/196* (2006.01)

(52) U.S. Cl.
CPC ............. *G08B 13/196* (2013.01); *G07C 9/20* (2020.01)

(58) Field of Classification Search
USPC .......................................................... 348/143
See application file for complete search history.

(56) References Cited

U.S. PATENT DOCUMENTS 11,037,067 B2 6/2021 Holliday et al.
11,403,934 B2 8/2022 Soo et al.
11,651,456 B1 5/2023 Day
2018/0075720 A1* 3/2018 Davies ...................... H04N 5/76
2018/0338006 A1* 11/2018 Blair, II ................ H04L 67/125
2023/0160598 A1 5/2023 Nilsson et al.
2023/0419210 A1 12/2023 Stenneth et al.

FOREIGN PATENT DOCUMENTS

CN 111541915 A 7/2020
EP 4001958 A1 5/2022

OTHER PUBLICATIONS

Halo Smart Sensor,—Put A Stop To Vaping In Your School Today!, Vape Detectors For Schools, Education, https://halodetect.com/markets/education/, downloaded from the internet: Aug. 1, 2024, all pages.
Halo Smart Sensor—Introducing the New Halo Smart Sensor 3C-PC, https://halodetect.com/markets/education, downloaded from the internet: Aug. 1, 2024, all pages.
Safety And Protection Solutions To Help You Protect Your People, https://www.ravemobilesafety.com/solutions/safety-protection/, downloaded from the internet: Jul. 22, 2024, all pages.

* cited by examiner

*Primary Examiner* — Nigar Chowdhury

(57) ABSTRACT

A method and system for unauthorized person alerting. The method includes activating at least one non-imaging sensor to capture non-imaging data. The non-imaging sensor monitors an area in respect of which a physical access control system restricts access. At least one processor is employed to generate a count of people present in the monitored area from computerized analysis of the non-imaging data. An unauthorized person alert is generated based on at least one of a plurality of alert conditions being satisfied.

20 Claims, 5 Drawing Sheets

400

METHOD AND SYSTEM FOR UNAUTHORIZED PERSON ALERTING

BACKGROUND

Access control may refer to restricting entrance to areas that may be defined by walls plus physical doors (e.g., doors through which humans may enter). Access control may also refer to restricting entrance to areas that may also be defined in other ways (for example, fences, gates, dividing structures, etcetera). Access control apparatus may limit entry into areas of buildings, rooms within buildings, real property, fenced-in regions, vehicles, etcetera, to only certain individuals who have permission to enter. Many access control systems can identify the individual attempting to enter the area and verify that the identified individual is currently authorized to enter.

Areas protected by access control can be monitored and further protected through the installations and use of video surveillance cameras in those areas; however video surveillance cameras may be inappropriate for certain types of areas where their installation and use might violate a person's expectations around privacy. For example, video surveillance cameras might be illegal, or at least unjustifiably invasive, for monitoring hotel rooms, dormitory rooms, and even possibly rented/leased premises as well (at least in respect of cameras not primarily in the possession and control of the tenants of rented/leased premises).

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
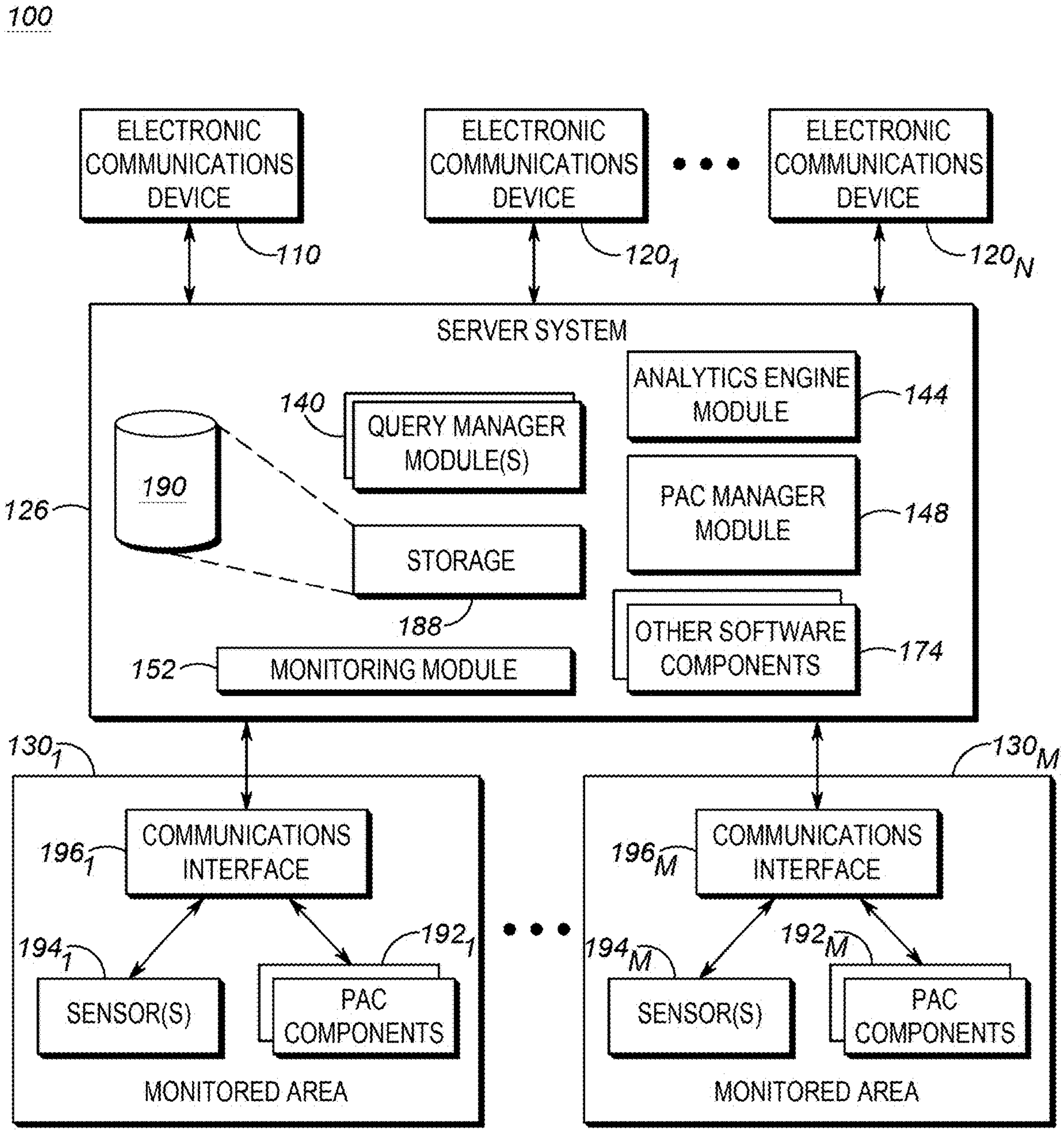
FIG. 1 is a block diagram of a monitoring system according to an example embodiment.

Skilled artisans will appreciate that elements in the figures are illustrated for simplicity and clarity and have not necessarily been drawn to scale. For example, the dimensions of some of the elements in the figures may be exaggerated relative to other elements to help improve an understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In accordance with one example embodiment, there is provided a computer-implemented method carried out within a physical access control system. The computer-implemented method includes activating at least one non-imaging sensor to capture non-imaging data. The non-imaging sensor monitors an area in respect of which the physical access control system restricts access. The computer-implemented method also includes employing at least one processor to generate a count of people present in the monitored area from computerized analysis of the non-imaging data. The computer-implemented method also includes generating an unauthorized person alert based on at least one of a plurality of alert conditions being satisfied. The plurality of alert conditions include a first condition that the count of the people exceeds a maximum count for the monitored area, and a second condition that the count of the people exceeds a reduced maximum count for the monitored area. A determination of the reduced maximum count is reached at least in part by subtracting a number of one or more system-authorized people from the maximum count based on one or more tracked locations, of the respective one or more system-authorized people, being outside of the monitored area.

In accordance with another example embodiment, there is provided an apparatus that includes at least one non-imaging sensor configured to capture non-imaging data and monitor an area in respect of which a physical access control system restricts access. The apparatus also includes at least one processor communicatively coupled to the at least one non-imaging sensor. The apparatus also includes at least one electronic storage medium storing program instructions that when executed by the at least one processor cause the at least one processor to perform: i) analyzing the non-imaging data to generate a count of people present in the monitored area; and ii) generating an unauthorized person alert based on at least one of a plurality of alert conditions being satisfied. The plurality of alert conditions include a first condition that the count of the people exceeds a maximum count for the monitored area, and a second condition that the count of the people exceeds a reduced maximum count for the monitored area. A determination of the reduced maximum count is reached at least in part by subtracting a number of one or more system-authorized people from the maximum count based on one or more tracked locations, of the respective one or more system-authorized people, being outside of the monitored area.

Each of the above-mentioned embodiments will be discussed in more detail below, starting with example system and device architectures of the system in which the embodiments may be practiced, followed by an illustration of processing blocks for achieving an improved technical method, device, and system for unauthorized person alerting.

Example embodiments are herein described with reference to flowchart illustrations and/or block diagrams of methods, apparatus (systems) and computer program products according to example embodiments. It will be understood that at least some blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Reference is now made to FIG. 1 which is a block diagram of an example monitoring system 100 within which methods in accordance with example embodiments can be carried out. Included within the illustrated monitoring system 100 are an electronic communications device 110 and additional electronic communications devices $\mathbf{120}_1$-$\mathbf{120}_N$ (hereinafter interchangeably referred to as "electronic communications devices $\mathbf{120}_1$-$\mathbf{120}_N$" when referring to all of the additional electronic communication devices, or "electronic communication device 120" when referring to any individual one of the plurality) where N is any suitable integer greater than one (although, in one alternative to what is illustrated, it is also contemplated that, rather than a plurality, there may be a single additional electronic communication device 120). Also included within the illustrated monitoring system 100 are a server system 126 and monitored areas $\mathbf{130}_1$-$\mathbf{130}_M$ (hereinafter interchangeably referred to as "monitored areas $\mathbf{130}_1$-$\mathbf{130}_M$" when referring to all of the monitored areas, or "monitored area 130" when referring to any individual one of the plurality) where M is any suitable integer greater than one.

Figure 4:
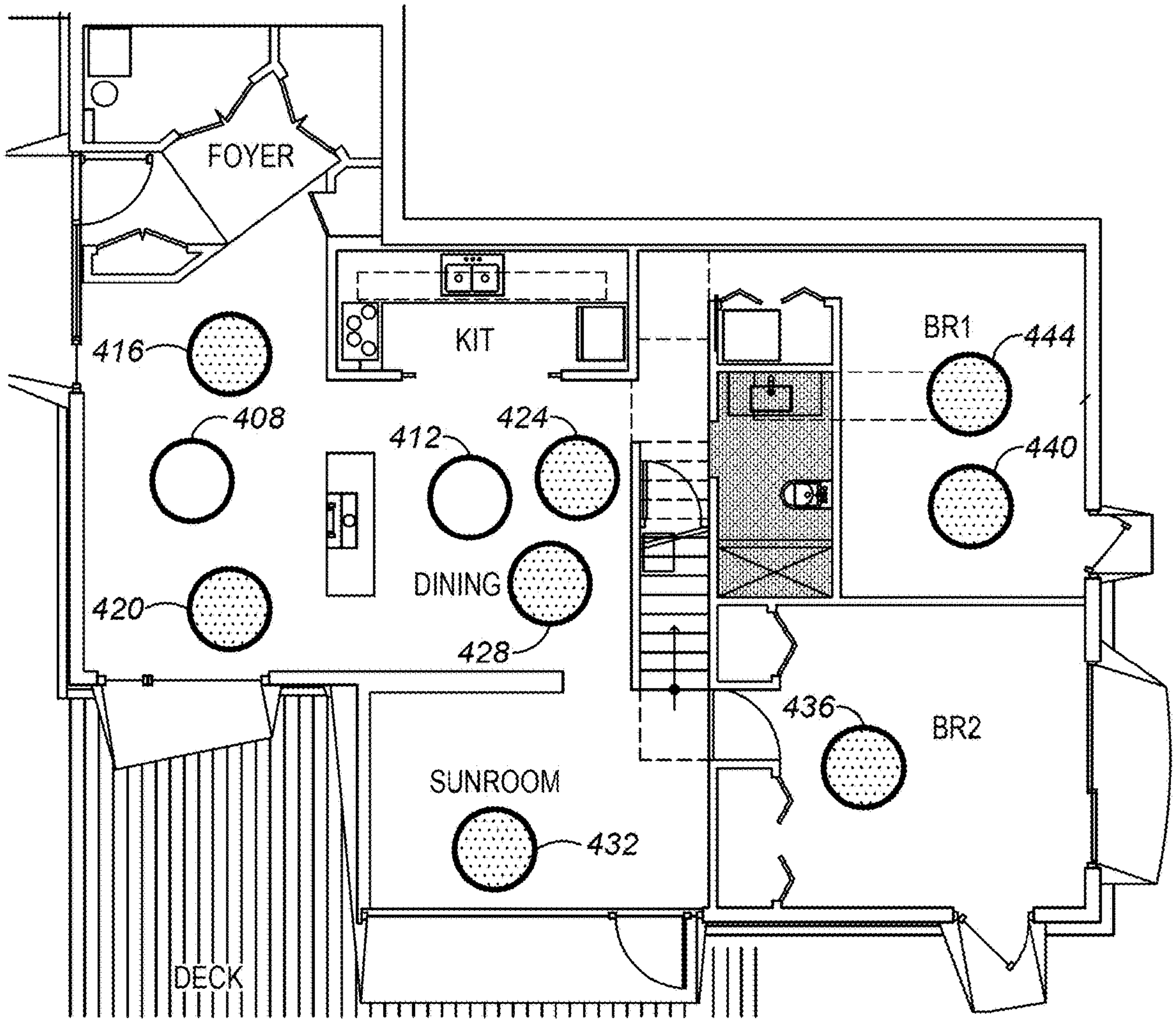
FIG. 4 is a diagram of an example interior space in a rented premises that may be protected by the monitoring system of FIG. 1.

More than one monitored area is shown in FIG. 1, but it will be understood that any suitable number of monitored areas is contemplated (including even just a single monitored area 130). In some examples, each of the monitored areas $\mathbf{130}_1$-$\mathbf{130}_M$ is an interior space within one of the following: a hotel room, a rented premises, a dormitory room, restricted office area(s), and a vehicle. Examples of monitored areas consistent with this disclosure are shown in expanded detail in other figures. For instance, FIG. 4 illustrates an example interior space 400 in a rented premises that may be protected by the monitoring system 100. The example interior space 400 will be herein discussed in more detail later on.

In some example embodiments, the electronic communications device 110 (and/or each of the additional electronic communications devices $\mathbf{120}_1$-$\mathbf{120}_N$) is a selected one or more of the following: a handheld device such as, for example, a tablet, a phablet, a smart phone or a personal digital assistant (PDA); a two-way radio; a smart watch; a laptop computer; and other suitable devices. With respect to the server system 126, this could comprise a single physical machine or multiple physical machines. It will be understood that the server system 126 need not be contained within a single chassis, nor necessarily will there be a single location for the server system 126. Furthermore, in some examples the server system 126 may be, in whole or in part, a cloud implementation. As will be appreciated by those skilled in the art, at least some of the functionality of the server system 126 can be implemented within other illustrated computing apparatus (i.e. rather than within the server system 126).

The electronic communications device 110 and the additional electronic communications devices $\mathbf{120}_1$-$\mathbf{120}_N$ communicate with the server system 126 through one or more networks. These networks can include the Internet, or one or more other public/private networks coupled together by network switches or other communication elements. The network(s) could be of the form of, for example, client-server networks, peer-to-peer networks, etc. Data connections between these electronic devices and the server system 126 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links).

The server system 126 is communicatively coupled to the communications interfaces $\mathbf{196}_1$-$\mathbf{196}_M$ of the respective monitored areas $\mathbf{130}_1$-$\mathbf{130}_M$ via one or more networks establishing communication between system devices in the monitored areas $\mathbf{130}_1$-$\mathbf{130}_M$ and the server system 126. These one or more networks between the server system 126 and the communications interfaces $\mathbf{196}_1$-$\mathbf{196}_M$ can include the Internet, or one or more other public/private networks coupled together by network switches or other communication elements. The network(s) could be of the form of, for example, client-server networks, peer-to-peer networks, etc. Data connections between the communications interfaces $\mathbf{196}_1$-$\mathbf{196}_M$ and the server system 126 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the monitored areas $\mathbf{130}_1$-$\mathbf{130}_M$ and the server system 126 are within the same Local Area Network (LAN).

Figure 2:
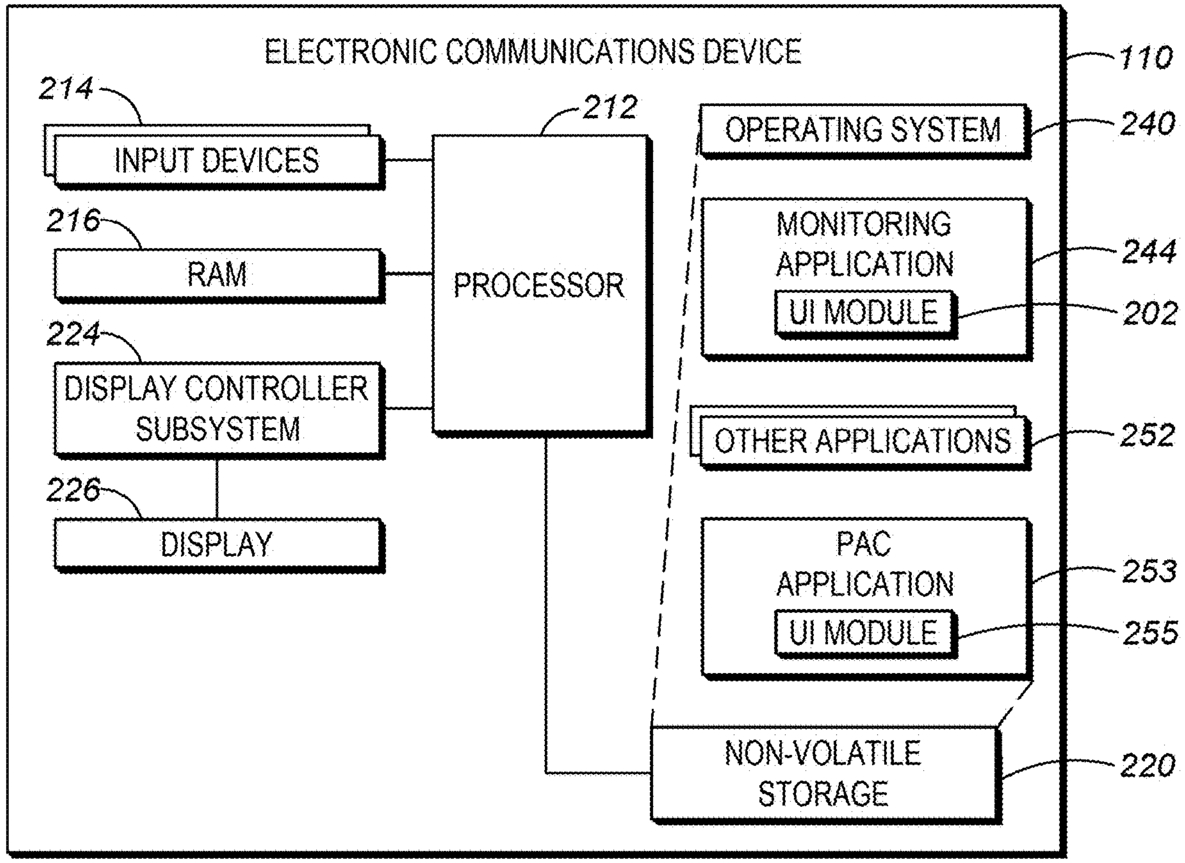
FIG. 2 is another block diagram providing additional detail in relation to an electronic communications device shown in FIG. 1.

Referring to FIG. 2, the electronic communications device 110 is illustrated in more detail. For convenience of illustration, one electronic communications device 110 is shown and described; however more than one electronic communication devices 110 is also contemplated.

The illustrated electronic communications device 110 includes at least one processor 212 that controls the overall operation of the electronic communications device. The processor 212 interacts with various subsystems such as, for example, input devices 214 (such as a selected one or more of a keyboard, mouse, touch pad, roller ball and voice control means, for example), Random Access Memory (RAM) 216, non-volatile storage 220 and display controller subsystem 224. The display controller subsystem 224 interacts with display 226 and it renders graphics and/or text upon the display 226.

Still with reference to the electronic communications device 110 of the monitoring system 100, operating system 240 and various software applications used by the processor 212 are stored in the non-volatile storage 220. The non-volatile storage 220 is, for example, one or more hard disks, solid state drives, or some other suitable form of computer readable medium that retains recorded information after the electronic communications device 110 is turned off. Regarding the operating system 240, this includes software that manages computer hardware and software resources of the electronic communications device 110 and provides common services for computer programs. Also, those skilled in the art will appreciate that the operating system 240, monitoring application 244, PAC application 253, and other applications 252, or parts thereof, may be temporarily loaded into a volatile store such as the RAM 216. The processor 212, in addition to its operating system functions, can enable execution of the various software applications on the electronic communications device 110.

Still with reference to FIG. 2, the monitoring application 244 can be run on the electronic communications device 110 and includes a User Interface (UI) module 202 for enabling a user of the electronic communications device 110 to carry out actions related to providing input such as, for example, input responsive to alerts, and other user-interaction functions that the monitoring application 244 is configured to provide. In such circumstances, the user of the electronic communications device 110 is provided with a user interface generated on the display 226 through which the user inputs and receives information in relation to the user-interaction functions of the monitoring application 244.

The PAC application 253 may, amongst other illustrated software constituents, include a session manager module, which provides a communications interface between the illustrated UI module 255 and a query manager module (i.e. a respective one of illustrated one or more query manager modules 140) of the server system 126. In at least some examples, the search session manager module of the PAC application 253 communicates with a respective one of the query manager module(s) 140 by way of Remote Procedure Calls (RPCs).

In addition to the query manager module(s) 140, the illustrated server system 126 includes an analytics engine module 144, a PAC manager module 148 and a monitoring module 152. In some examples, the analytics engine module 144 may include a physical security analytics module for analyzing access control activity, radar detection activity and/or motion sensor events. In some examples, the analytics engine module 144 may also include one or more learning machines (such as, for instance, one or more convolutional neural networks). In some examples, some or all of the analytics engine module 144 may be implemented outside of the server system 126 (for instance, implementation may be in one or more of edge devices of the monitoring system 100).

The server system 126 also includes a number of other software components 174. These other software components will vary depending on the requirements of the server system 126 within the overall system. As just one example, the other software components 174 might include special test and debugging software, or software to facilitate version updating of modules within the server system 126. The server system 126 also includes one or more data stores 188. In some examples, the data store 188 comprises database(s) 190.

Still with reference to FIG. 1, each of the monitored areas $\mathbf{130}_1$-$\mathbf{130}_M$ may include one or more doors, gates or other entry/exit barriers which are controllably locked and unlocked. These entry/exit barriers are coupled to respective Physical Access Control (PAC) components. For example, the monitored area $\mathbf{130}_1$ includes PAC components $\mathbf{192}_1$. The PAC components may include access controller(s), door controller(s), credential reader(s) and/or other components (the details of which will be understood to one skilled in the art and which will vary depending on the implementation of access control within each of the monitored areas $\mathbf{130}_1$-$\mathbf{130}_M$).

In at least one example, access controllers of the PAC components $\mathbf{192}_1$-$\mathbf{192}_M$ may log events, and the logs may be configured via an interface provided by the UI module 255 of the PAC application 253 to establish any number of devices, services, and systems as event recipients. Some or all of the above-mentioned access controllers may be configured to send the events to the PAC manager module 148 and/or the monitoring module 152 in any number of formats including, for example, SNMP, XML via direct socket connection (GSM, LAN, WAN, WiFi™), Syslog, and through a serial port. Also, the PAC manager module 148 and/or the monitoring module 152 may be configured to receive these events and/or data derived from these events.

In some examples, credential readers of the PAC components $\mathbf{192}_1$-$\mathbf{192}_M$ may receive credential information from individuals entering respective monitored areas $\mathbf{130}_1$-$\mathbf{130}_M$. As will be understood by one skilled in the art, this credential information may be encoded in any one or more of an RFID chip, a credential on a smart card, a PIN/password input using a keypad, and biometric data such as fingerprint and retina scan data, for example.

Regarding the illustrated one or more databases 190, these may include a credential and policy directory (or alternatively the server system 126 could include a separate storage, i.e. distinct from the storage 188, for the purpose of supporting the credential and policy directory). In some examples, physical access control may be integrated with a video surveillance system, but alternatively it is also contemplated that these might not be integrated and instead operate independently of each other.

The PAC components $\mathbf{192}_1$-$\mathbf{192}_M$ may incorporate various alarms, such as for a propped open door, a stuck unlocked locking mechanism, and other indications of breach or fault. In at least one example, notification of these conventional access control alarms may appear within the UI module 255 of the PAC application 253 on the electronic communications device 110. In at least one alternative example, alarm and alert delivery is unified via the monitoring module 152 which pushes alarm/alert messages and notifications to the monitoring application 244.

Figure 3:
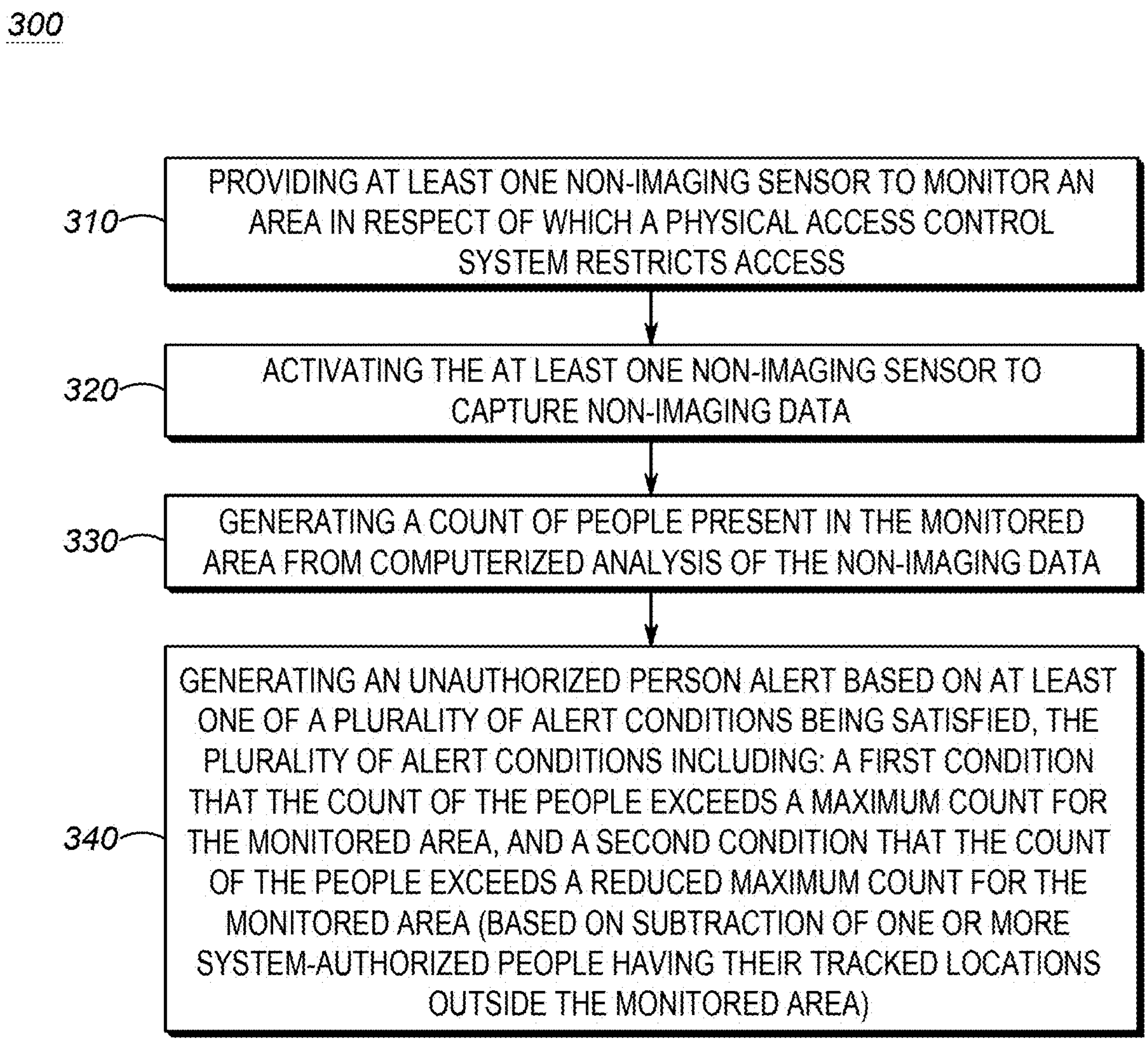
FIG. 3 is a flow chart illustrating a computer-implemented method in accordance with an example embodiment.

Reference is now made to FIG. 3. FIG. 3 is a flow chart illustrating a method 300 in accordance with an example embodiment.

Firstly in the method 300, at least one non-imaging sensor, that monitors an area in respect of which a physical access control system restricts access, is provided (310).

Next in the method 300, the at least one non-imaging sensor is activated (320) to capture non-imaging data.

Next in the method 300, a count of people present in the monitored area is generated (330) from computerized analysis of the non-imaging data. For example, EP Pat. Appln. No. 4,001,958 of Boran describes in detail one implementation that could be modified without inventive effort to achieve people counting consistent with the illustrated method 300. In Boran, mmWave radar sensor devices are employed and radar wave reflections are analyzed (e.g. signal strength) in connection with generating people counts from collected radar data. Other implementations and approaches that employ non-imaging sensor(s) to generate people counts are also contemplated. As another example, HALO-3C-PC™ sold by Motorola Solutions, Inc. includes device functionality to register disturbances in a room's thermal signature (which can then be computer-analyzed to determine whether it is a person within the sensor's field of vision).

Next in the method 300, an unauthorized person alert (for example, an electronic message intended for the electronic communications device 110) is generated (340) based on at least one of a plurality of alert conditions being satisfied. The plurality of alert conditions includes a first condition that the count of the people exceeds a maximum count for the monitored area (the maximum count may be a fixed number, but alternatively may also be a variable number that assumes different values over a preestablished schedule of the physical access control system). In at least one example, delivery of an unauthorized person alert to a user of the electronic communications device 110 may be facilitated in part by action of the monitoring application 244.

FIG. 4 illustrates an example of the above-mentioned first condition being satisfied. Within the interior space 400, circular symbols 408, 412, 416, 420, 424, 428, 432, 436, 440 and 444 represent determined locations of people. In this example, two is the maximum count of people for the monitored area (i.e. in this example the monitored area is an area that dimensionally matches all monitored parts of the interior space 400). Thus the circular symbols 408 and 412 correspond to the two authorized people. The circular symbols 416, 420, 424, 428, 432, 436, 440 and 444 correspond to eight unauthorized people. Delivery to a user of the electronic communications device 110 of an unauthorized person alert (e.g. that provides details of the eight unauthorized people) may be facilitated in part by action of the monitoring application 244.

Still with reference to the method 300, the plurality of alert conditions also includes a second condition that the count of the people exceeds a reduced maximum count for the monitored area. The second condition might only be checked when it is first determined that the maximum count is not exceeded; however alternatively it is also contemplated that the second condition might be checked regardless of whether or not the maximum count is exceeded. Also, in respect of this reduced maximum count, a determination is reached at least in part by subtracting a number of one or more system-authorized people from the maximum count based on one or more tracked locations, of the respective one or more system-authorized people, being outside of the monitored area.

Figure 5:
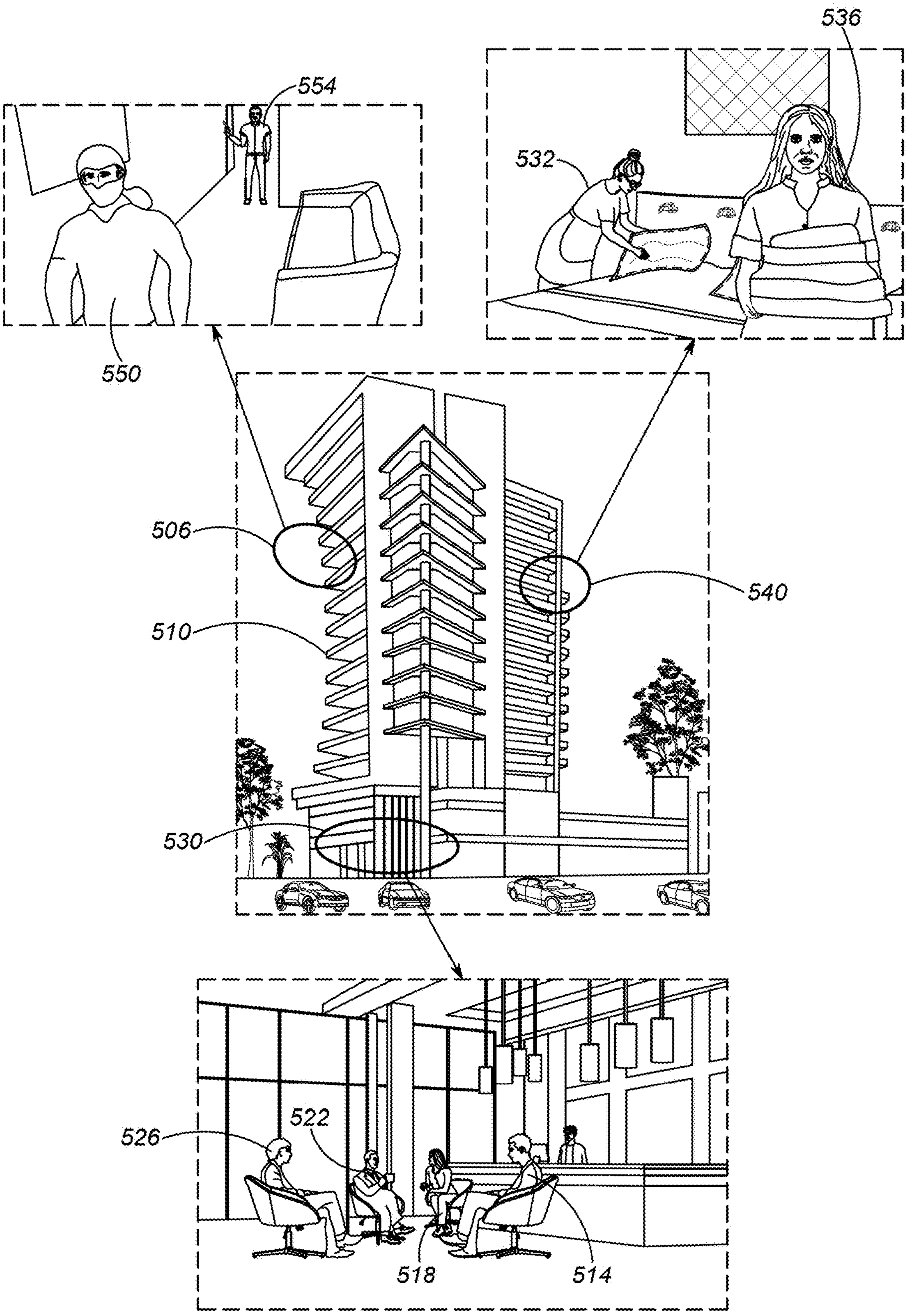
FIG. 5 is a diagram of a hotel building to illustrate an example of a reduced maximum count of zero people for a monitored area.

FIG. 5 illustrates an example of a reduced maximum count of zero people for a monitored area 506 in a hotel building 510. In this example, authorized hotel guests 514, 518, 522 and 526 are not present in their hotel room (i.e. the monitored area 506). Instead the hotel guests 514, 518, 522 and 526 are sitting on chairs in a reception area 530 of the hotel building 510. Other authorized people 532 and 536 (i.e. cleaning staff assigned to a same hotel floor) are also not present in the monitored area 506, but are instead working in a different area 540. Those skilled in the art will recognize that near real-time locations of the authorized hotel guests 514, 518, 522 and 526 and the cleaning staff 532 and 536 may be obtained using conventional devices and techniques. For example, individual ones of the electronic communications devices $\mathbf{120}_1$-$\mathbf{120}_N$ may be possessed by each of respective guests and hotel employees, and these electronic communications devices $\mathbf{120}_1$-$\mathbf{120}_N$ may be configured to transmit respective near real-time locations to the server system 126.

Continuing on in respect of the FIG. 5 example, since no authorized persons have locations matching that of the monitored area 506, the reduced maximum count of people for the monitored area 506 is zero. Thus, the detected presence of thieves 550 and 554 within the monitored area 506 causes an unauthorized person alert to be generated. Delivery to a user of the electronic communications device 110 of an unauthorized person alert (e.g. that provides details of the intruders) may be facilitated in part by action of the monitoring application 244.

Any suitable manner for obtaining the tracked locations of system-authorized people is contemplated. For instance, tracked locations of respective system-authorized people may be wireless received prior to any generating of an unauthorized person alert. For example, at least some of the electronic communications devices $\mathbf{120}_1$-$\mathbf{120}_N$ may be wireless devices, and one or more tracked locations of respective one or more system-authorized people may originate from the electronic communication devices $\mathbf{120}_1$-$\mathbf{120}_N$ that are in the possession of those people.

Also, in one example, a particular tracked location might only obtained after first determining that a respective system-authorized person has not provide his or her access control credentials at an access control reader (i.e. one of the of PAC components $\mathbf{192}_1$-$\mathbf{192}_M$) that is adjacent an entry portal to the monitored area 130.

As already mentioned, an unauthorized person alert may be, for instance, an electronic message intended for (and transmitted to) the electronic communications device 110. In one example, the electronic message includes a description of a recommended action for the message recipient to take.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot generate an unauthorized person alert within a monitoring system, among other features and functions set forth herein).

In the foregoing specification, specific embodiments have been described. However, one of ordinary skill in the art appreciates that various modifications and changes can be made without departing from the scope of the invention as set forth in the claims below. For instance, while doors are herein described as one type of barrier at access control points, those skilled in the art will understand that other types of barriers are contemplated. Examples of other types of barriers include turnstiles, gates, etc.

Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method carried out within a physical access control system, the computer-implemented method comprising:

activating at least one non-imaging sensor to capture non-imaging data, the non-imaging sensor monitoring an area in respect of which the physical access control system restricts access;

employing at least one processor to generate a count of people present in the monitored area from computerized analysis of the non-imaging data; and generating an unauthorized person alert based on at least one of a plurality of alert conditions being satisfied, the plurality of alert conditions including:

a first condition that the count of the people exceeds a maximum count for the monitored area, and a second condition that the count of the people exceeds a reduced maximum count for the monitored area, wherein a determination of the reduced maximum count is reached at least in part by subtracting a number of one or more system-authorized people from the maximum count based on one or more tracked locations, of the respective one or more system-authorized people, being outside of the monitored area.

2. The computer-implemented method of claim 1 wherein the monitored area is an interior space within one of the following: a hotel room, a rented premises, a dormitory room, and a vehicle.

3. The computer-implemented method of claim 1 further comprising wireless receiving the one or more tracked locations of the one or more system-authorized people prior to the generating of the unauthorized person alert.

4. The computer-implemented method of claim 3 wherein the one or more tracked locations are only obtained after first determining that the respective one or more system-authorized people have not provide access control credentials at an access control reader of the physical access control system that is adjacent an entry portal to the monitored area.

5. The computer-implemented method of claim 3 wherein the one or more tracked locations of the one or more system-authorized people originate from respective one or more electronic communication devices of the one or more system-authorized people.

6. The computer-implemented method of claim 5 wherein the one or more electronic communication devices are at least one of: i) one or more two-way radios; ii) one or more smart phones; and iii) one or more smart watches.

7. The computer-implemented method of claim 1 further comprising transmitting the unauthorized person alert to at least one electronic communications device as an electronic message.

8. The computer-implemented method of claim 7 wherein the at least one electronic communication device is one or more two-way radios, one or more smart phones, one or more smart watches, or a combination thereof.

9. The computer-implemented method of claim 7 wherein the electronic message includes a description of a recommended action for the message recipient to take.

10. The computer-implemented method of claim 1 wherein the maximum count is a variable number that assumes different values over a preestablished schedule of the physical access control system.

11. An apparatus comprising:

at least one non-imaging sensor configured to capture non-imaging data and monitor an area in respect of which a physical access control system restricts access;

at least one processor communicatively coupled to the at least one non-imaging sensor; and at least one electronic storage medium storing program instructions that when executed by the at least one processor cause the at least one processor to perform:

analyzing the non-imaging data to generate a count of people present in the monitored area; and generating an unauthorized person alert based on at least one of a plurality of alert conditions being satisfied, the plurality of alert conditions including:

a first condition that the count of the people exceeds a maximum count for the monitored area, and a second condition that the count of the people exceeds a reduced maximum count for the monitored area, wherein a determination of the reduced maximum count is reached at least in part by subtracting a number of one or more system-authorized people from the maximum count based on one or more tracked locations, of the respective one or more system-authorized people, being outside of the monitored area.

12. The apparatus of claim 11 wherein the monitored area is an interior space within one of the following: a hotel room, a rented premises, a dormitory room, one or more restricted office areas, and a vehicle.

13. The apparatus of claim 11 further comprising a server system configured to wireless receive the one or more tracked locations of the one or more system-authorized people prior to the generating of the unauthorized person alert.

14. The apparatus of claim 13 wherein the server system is further configured to obtain the one or more tracked locations only after first determining that the respective one or more system-authorized people have not provide access control credentials at an access control reader of the physical access control system that is adjacent an entry portal to the monitored area.

15. The apparatus of claim 13 wherein the one or more tracked locations of the one or more system-authorized people originate from respective one or more electronic communication devices of the one or more system-authorized people.

16. The apparatus of claim 15 wherein the one or more electronic communication devices are at least one of: i) one or more two-way radios; ii) one or more smart phones; and iii) one or more smart watches.

17. The apparatus of claim 11 further a server system configured to transmit the unauthorized person alert to at least one electronic communications device as an electronic message.

18. The apparatus of claim 17 wherein the at least one electronic communication device is one or more two-way radios, one or more smart phones, one or more smart watches, or a combination thereof.

19. The apparatus of claim 17 wherein the electronic message includes a description of a recommended action for the message recipient to take.

20. The apparatus of claim 11 wherein the maximum count is a variable number that assumes different values over a preestablished schedule of the physical access control system.

* * * * *